(12) United States Patent
Tsai

(10) Patent No.: US 6,282,981 B1
(45) Date of Patent: Sep. 4, 2001

(54) HANDLEBAR HEIGHT ADJUSTABLE DEVICE FOR A SKATE CART

(76) Inventor: Shui Te Tsai, No. 24, Lane 69, Tian Jin Road Section 5, Pei Tun Dist., Taichung City (TW)

(*) Notice: Subject to any disclaimer, the term of this patent is extended or adjusted under 35 U.S.C. 154(b) by 0 days.

(21) Appl. No.: 09/478,505

(22) Filed: Jan. 6, 2000

(30) Foreign Application Priority Data

Aug. 10, 1998 (CN) .............................................. 087213136

(51) Int. Cl.$^7$ .................................................. B62K 21/22
(52) U.S. Cl. ..................... 74/551.3; 280/87.041
(58) Field of Search .................... 74/551.1, 551.3, 74/551.6, 551.7; 280/279, 280, 87.041, 87.05

(56) References Cited

U.S. PATENT DOCUMENTS

| | | | | |
|---|---|---|---|---|
| 1,994,303 | * | 3/1935 | Clark ................................... | 74/551.6 |
| 4,203,610 | * | 5/1980 | Mihalik ............................ | 280/87.041 |
| 5,201,244 | * | 4/1993 | Stewart et al. .................. | 74/551.1 X |

\* cited by examiner

*Primary Examiner*—Mary Ann Green
(74) *Attorney, Agent, or Firm*—Browdy and Neimark

(57) ABSTRACT

A handlebar height device for a skate cart includes a head tube through which a handlebar column extends. The head tube has a top section and a lower section which has an enlarged inner diameter. A steerer tube is inserted into the lower section and has an open top. The handlebar column is retractably received in the head tube and the steerer tube via the open top of the steerer tube.

1 Claim, 5 Drawing Sheets

HANDLEBAR HEIGHT ADJUSTABLE DEVICE FOR A SKATE CART

FIELD OF THE INVENTION

The present invention relates to a handlebar height adjustable device for a skate cart. The head tube of the skate cart has a lower section with an enlarged diameter and a steerer tube is received in the lower section, a handlebar column retractably received in the steerer tube.

BACKGROUND OF THE INVENTION

A conventional skate cart as shown in FIGS. 4 and 5 includes a frame 13 which is pivotally connected to a front part of the skate cart at the first end of the frame 13 by a connection means 11. A rear wheel 12 is connected to the second end of the frame 13. The front part includes a head tube 15 which has a lower end in which an inner threaded portion 21 is defined. A steerer tube 140 is threadedly engaged with the inner threaded portion 21 in the head tube 14 at the outer threaded portion 141 of the steerer tube 140. A front wheel 14 is connected to the steerer tube 140. A positioning tube 2 is connected to the head tube 15 at the end of the head tube 15 opposite to the front wheel 14 and a handlebar column 160 is retractably received in the positioning tube 2. A lowest position of a handlebar 16 is when the lower end of the handlebar column 160 contacts the top of the steerer tube 140. For a safety reason, the handlebar column 160 has to be received in at least one-third of the positioning tube 2 from a top of the positioning tube 2. In other words, the maximum distance that the handlebar column 160 can be adjusted relative to the positioning tube 2 is "H". Nevertheless, the length is not long enough for different users.

The present invention intends to provide a handlebar height adjustable device for a skate cart wherein the handlebar column is retractably received in a steerer tube in the head tube so that a longer length of the handlebar column is received in the head tube.

SUMMARY OF THE INVENTION

In accordance with one aspect of the present invention, there is provided a handlebar height device for a skate cart and comprising a head tube having a top section and a lower section which has an enlarged inner diameter. A steerer tube is inserted into the lower section and has an open top. A handlebar column is retractably received in the head tube and the steerer tube via the open top of the steerer tube.

The object of the present invention is to provide a handlebar height device for a skate cart wherein the steerer tube has an open top and is received in the head tube. The handlebar column is retractably received in the head tube and inserted into the steerer tube via the open top so that a longer handlebar column can be employed.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
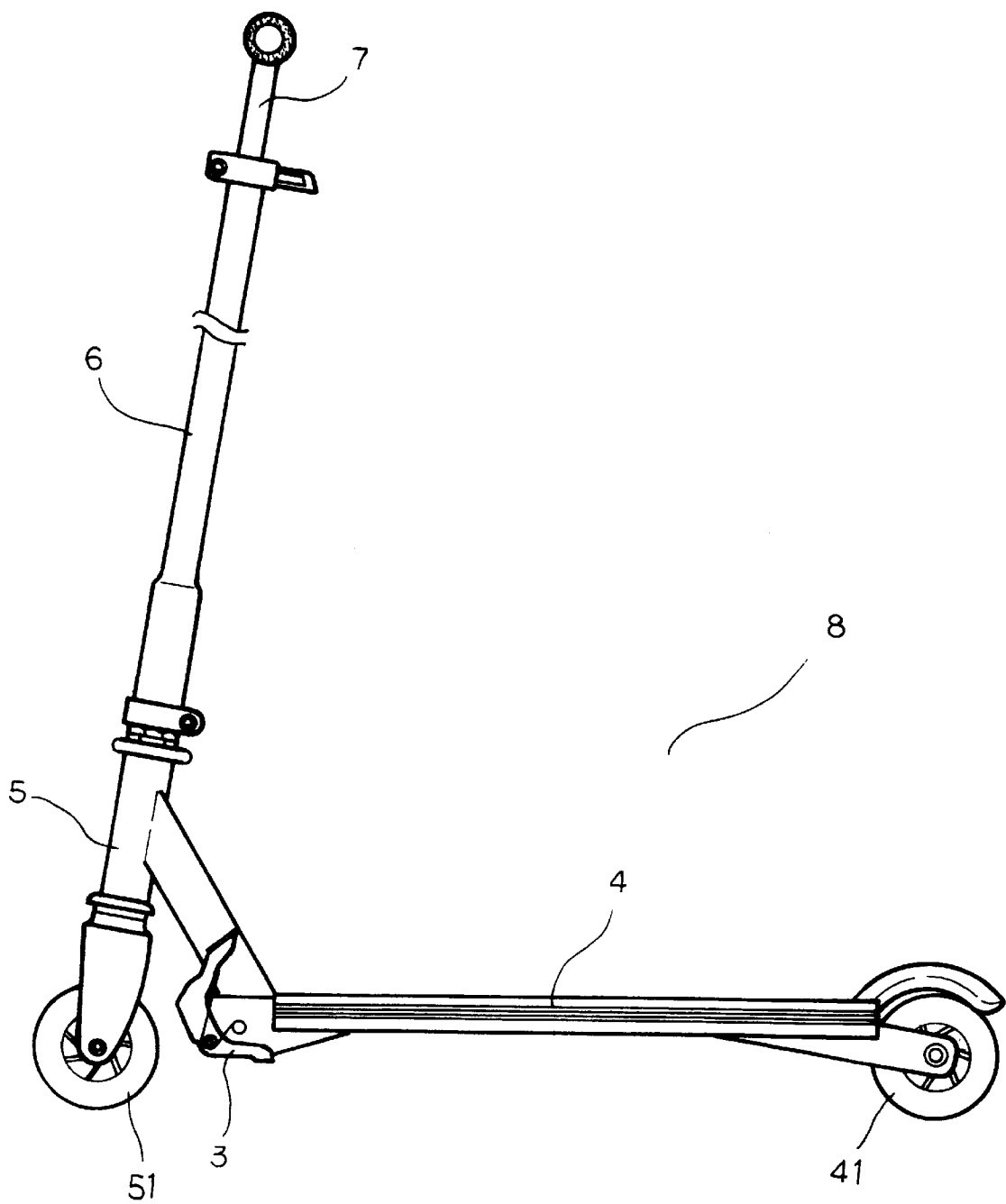
FIG. 1 is a side view to show the skate cart having the handlebar height device of the present invention.
Figure 2:
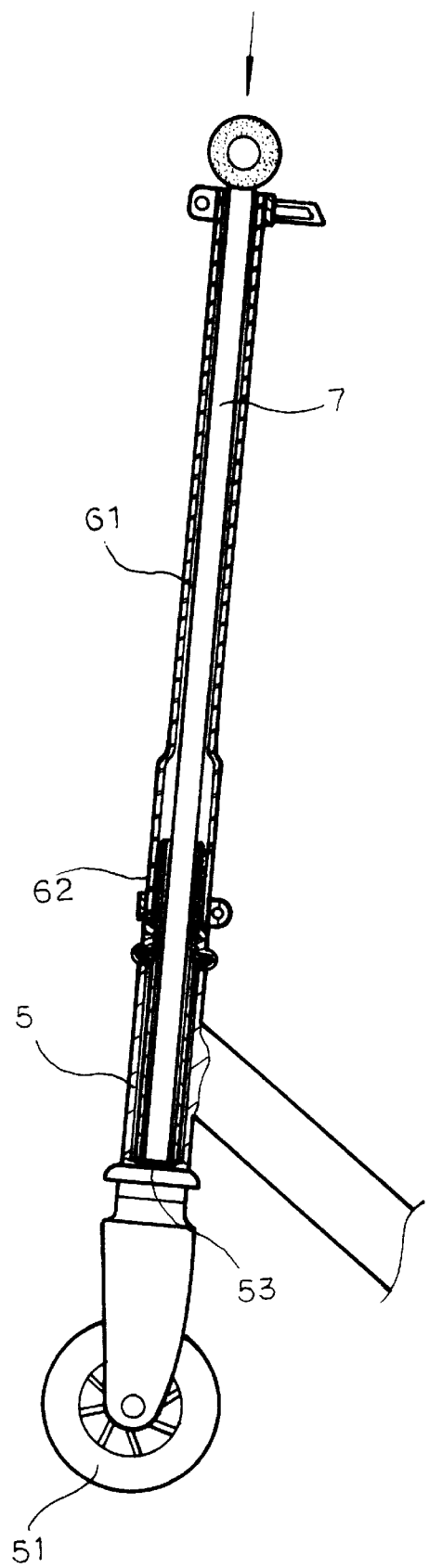
FIG. 2 is a cross sectional view to show that the handlebar column is completely received in the head tube of the skate cart.

Referring to FIGS. 1 and 2, the skate cart 8 of the present invention comprises a frame 4 and a front part which is pivotally connected to the frame 4 by a connection means 3. A rear wheel 41 is connected to the frame 4. The front part includes a head tube 5 to which a front wheel 51 is connected to one end of the head tube 5 and a positioning tube 6 is connected to the other end of the head tube 5. A handlebar column 7 is retractably received in the positioning tube 6 and the head tube 5.

A steerer tube 53 is inserted into the head tube 5 and has an open top. A positioning tube 6 is connected to the head tube 5 and includes a normal section 61 and an enlarged section 62 which is connected with the head tube 5. The steerer tube 5 extends through the head tube 5 and is inserted in the enlarged section 62 of the positioning tube 6. A handlebar column 7 is retractably received in the head tube 5 via a top of the positioning tube 6 and is received in the steerer tube 53 via the open top of the steerer tube 53.

Figure 3:
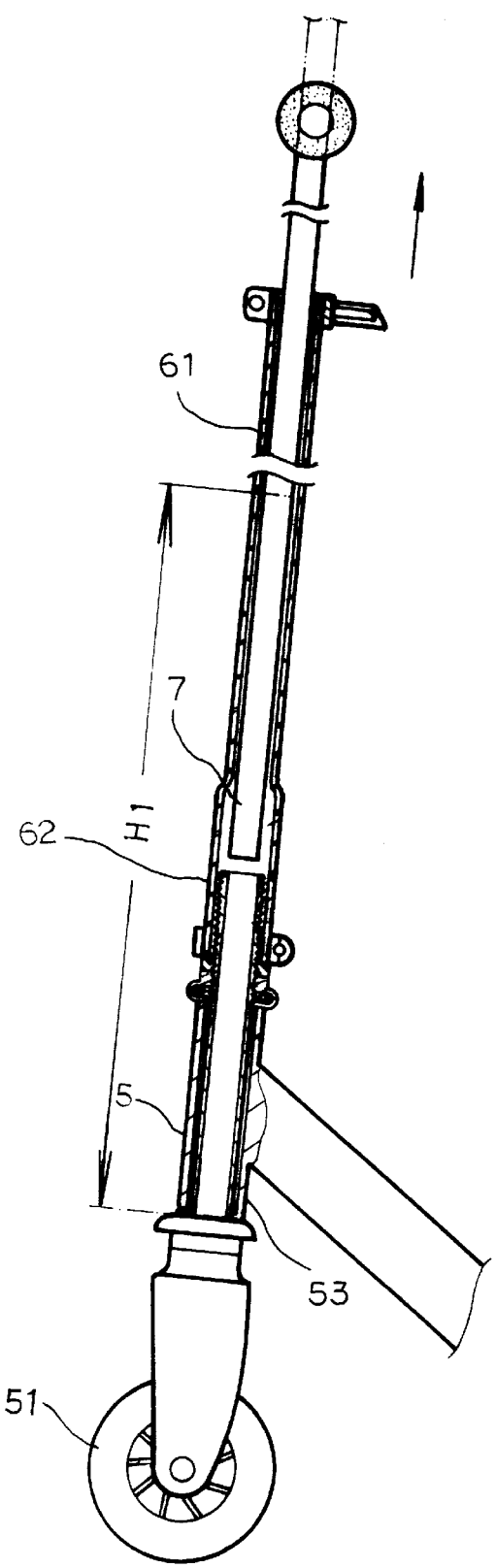
FIG. 3 is a cross sectional view to show that the handlebar column is pulled from the head tube of the skate cart.
Figure 4:
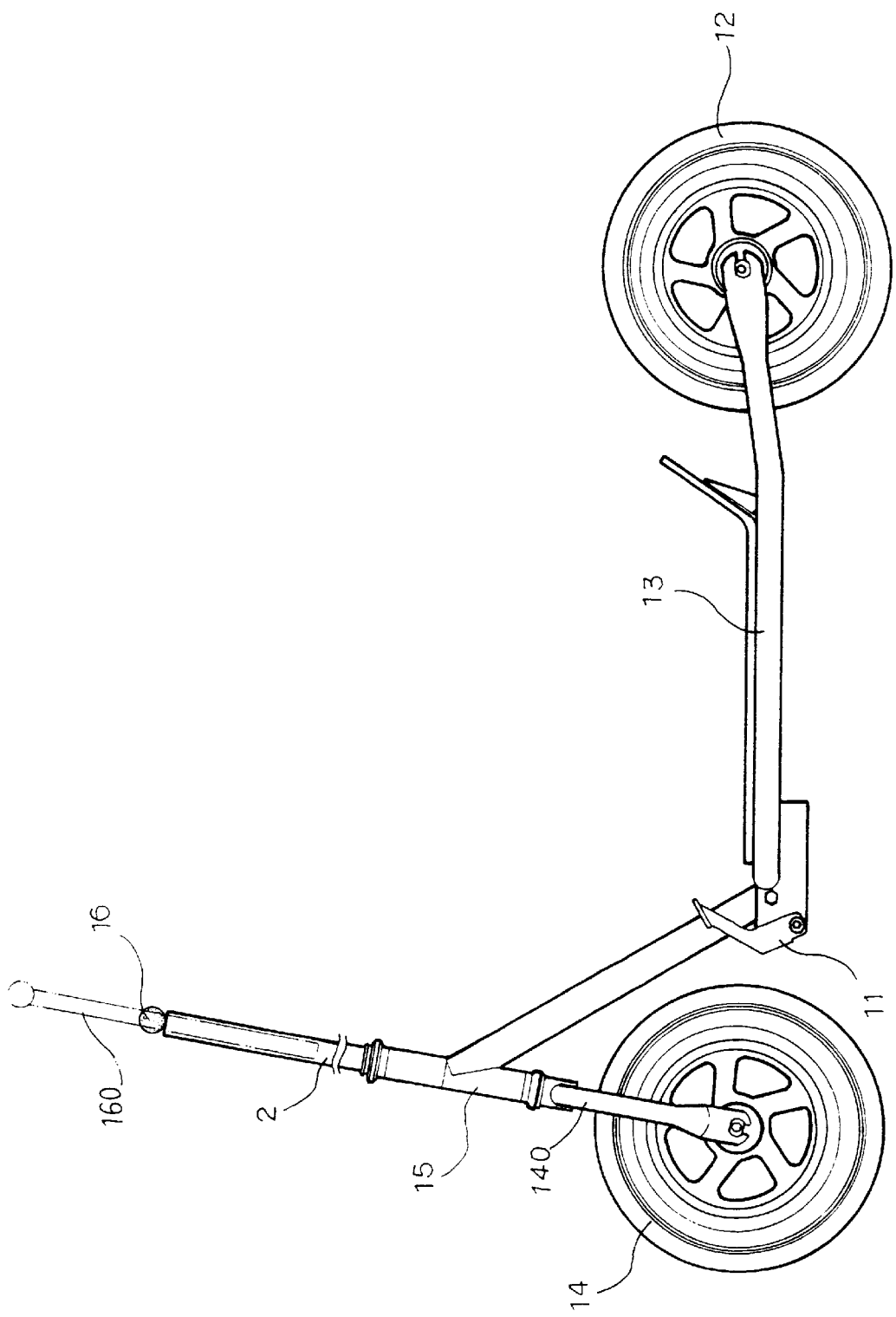
FIG. 4 is a side view to show a conventional skate cart.
Figure 5:
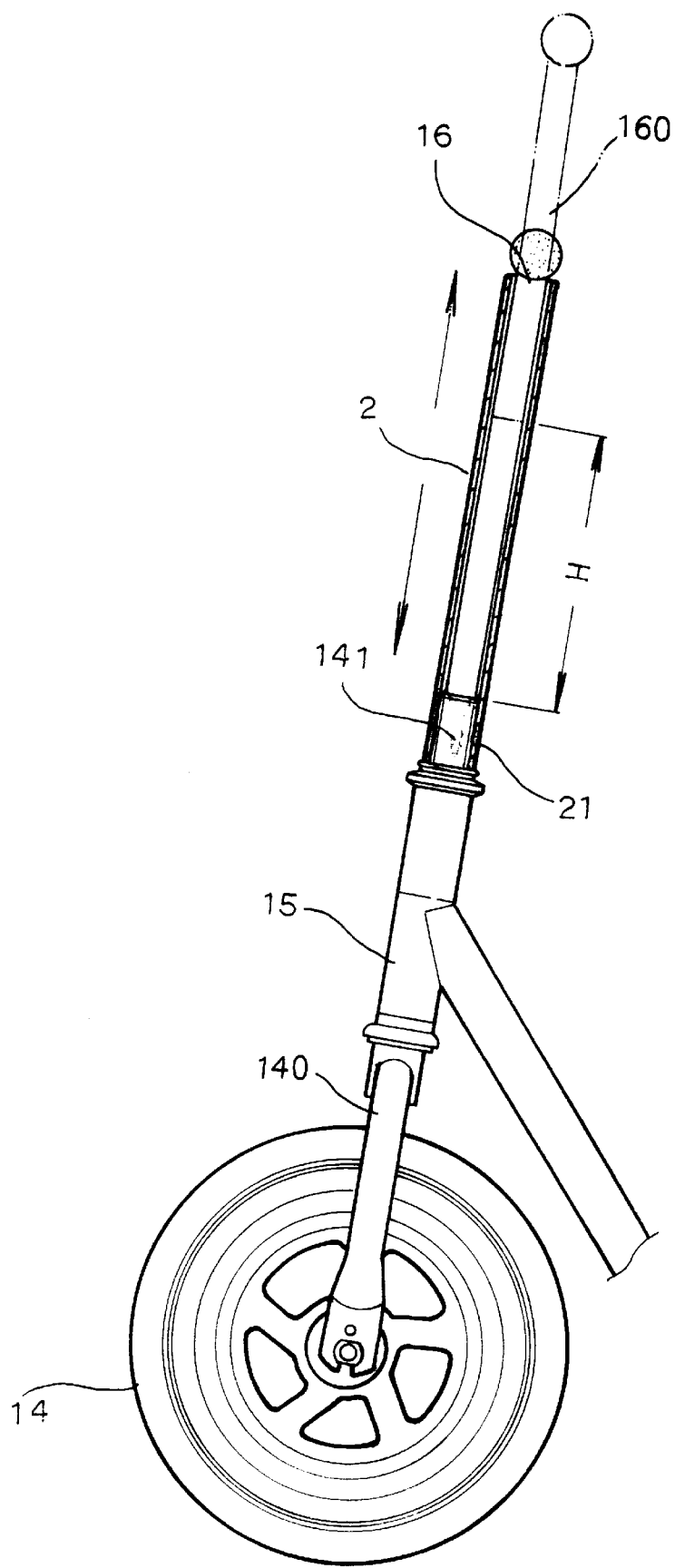
FIG. 5 is a cross sectional view to show that the handlebar column of the conventional skate cart is pulled from the head tube.

As shown in FIG. 3, the lowest end of the handlebar column 7 can be received in the steerer tube 53 so that the length of the handlebar column 7 can be a made to be longer than that shown in FIGS. 4 and 5. Therefore, when pulling the handlebar column 7 from the positioning tube 6, a longer distance "H1" is obtained.

While we have shown and described various embodiments in accordance with the present invention, it should be clear to those skilled in the art that further embodiments may be made without departing from the scope and spirit of the present invention.

What is claimed is:

1. A handlebar height device for a skate cart comprising:
a head tube having a top;
a position tube having an upper section and a lower section, said lower section being connected to the top of said head tube and having an enlarged inner diameter relative to said upper section;
a steerer tube received within said head tube and having an open top, said steerer tube extending above the top of said head tube and being inserted within said enlarged lower section of said position tube; and
a handlebar column retractably received in said position tube and said steerer tube via said open top of said steerer tube.

\* \* \* \* \*